United States Patent [19]

Shoji

[11] Patent Number: 5,581,374
[45] Date of Patent: Dec. 3, 1996

[54] COLOR IMAGE COMMUNICATING APPARATUS

[75] Inventor: Fumio Shoji, Yokohama, Japan

[73] Assignee: Canon Kabushiki Kaisha, Tokyo, Japan

[21] Appl. No.: 16,106

[22] Filed: Feb. 10, 1993

[30] Foreign Application Priority Data

Feb. 18, 1992 [JP] Japan ................ 4-030713

[51] Int. Cl.⁶ .............................. H04N 1/46; H04N 1/00
[52] U.S. Cl. .................... 358/500; 358/505; 358/440
[58] Field of Search .................... 358/524, 523, 358/504, 505, 500, 501, 512, 440, 444, 406, 468, 407, 438, 434, 400; 379/100; 382/63, 58, 17; 342/456, 459; 235/469

[56] References Cited

U.S. PATENT DOCUMENTS

| | | | |
|---|---|---|---|
| 3,196,393 | 7/1965 | Siegemund | 235/469 |
| 3,513,320 | 5/1970 | Weldon | 235/469 |
| 4,086,443 | 4/1978 | Gorham et al. | 358/440 |
| 4,113,993 | 9/1978 | Heckman et al. | 358/440 |
| 4,710,806 | 12/1987 | Iwai et al. | 358/524 |
| 4,941,184 | 7/1990 | Sato | 358/524 |
| 5,014,328 | 5/1991 | Rudak | 358/524 |
| 5,014,329 | 5/1991 | Rudak | 358/524 |
| 5,247,591 | 9/1993 | Baran | 358/440 |

FOREIGN PATENT DOCUMENTS 1426698  3/1976  United Kingdom .

*Primary Examiner*—Edward L. Coles, Sr.
*Assistant Examiner*—Fan Lee
*Attorney, Agent, or Firm*—Fitzpatrick, Cella, Harper & Scinto

[57] ABSTRACT

A color image communicating apparatus having a color image reader and a color image processing function comprises a color image reader and a destination information producing circuit to produce destination information such as destination color or destination number in correspondence to the kind of color read by the color image reader. The destination information producing circuit executes a character recognition processing to the image read by the color image reader, thereby producing the destination information. The destination information producing circuit has a memory to store the destination information in correspondence to the color kind.

16 Claims, 7 Drawing Sheets

FIG. 6

| DESTINATION COLOR | FACSIMILE NUMBER | NAME | COLOR DESTINATION REGISTRATION SHEET |
|---|---|---|---|
| RED BLUE | 08-8758-2474 | YANON CO. LTD., | |
| | ------ | | |
| | | | |

COLOR IMAGE COMMUNICATING APPARATUS

BACKGROUND OF THE INVENTION

1. Field of the Invention

The present invention relates to a color image communicating apparatus having a color image reader.

2. Related Background Art

Hitherto, when a destination number or the like is registered into a facsimile apparatus, the operator registers it to a one-touch dial key or the like by operations.

The above conventional method, however, has a drawback such that since the operations are complicated, the registering operation is complicated and it is difficult to operate.

SUMMARY OF THE INVENTION

It is an object of the present invention to improve the dialing operation.

Another object of the invention is to provide a color image communicating apparatus for producing destination information in accordance with the kind of color which has been read by a color image reader.

The above and other objects and features of the present invention will become apparent from the following detailed description and the appended claims with reference to the accompanying drawings.

BRIEF DESCRIPTION OF THE DRAWINGS

FIG. 6 is a diagram showing a registration special sheet which is used in the embodiment of the invention.

DETAILED DESCRIPTION OF THE PREFERRED EMBODIMENTS

An embodiment of the present invention will now be described with reference to the drawings.

Figure 1:
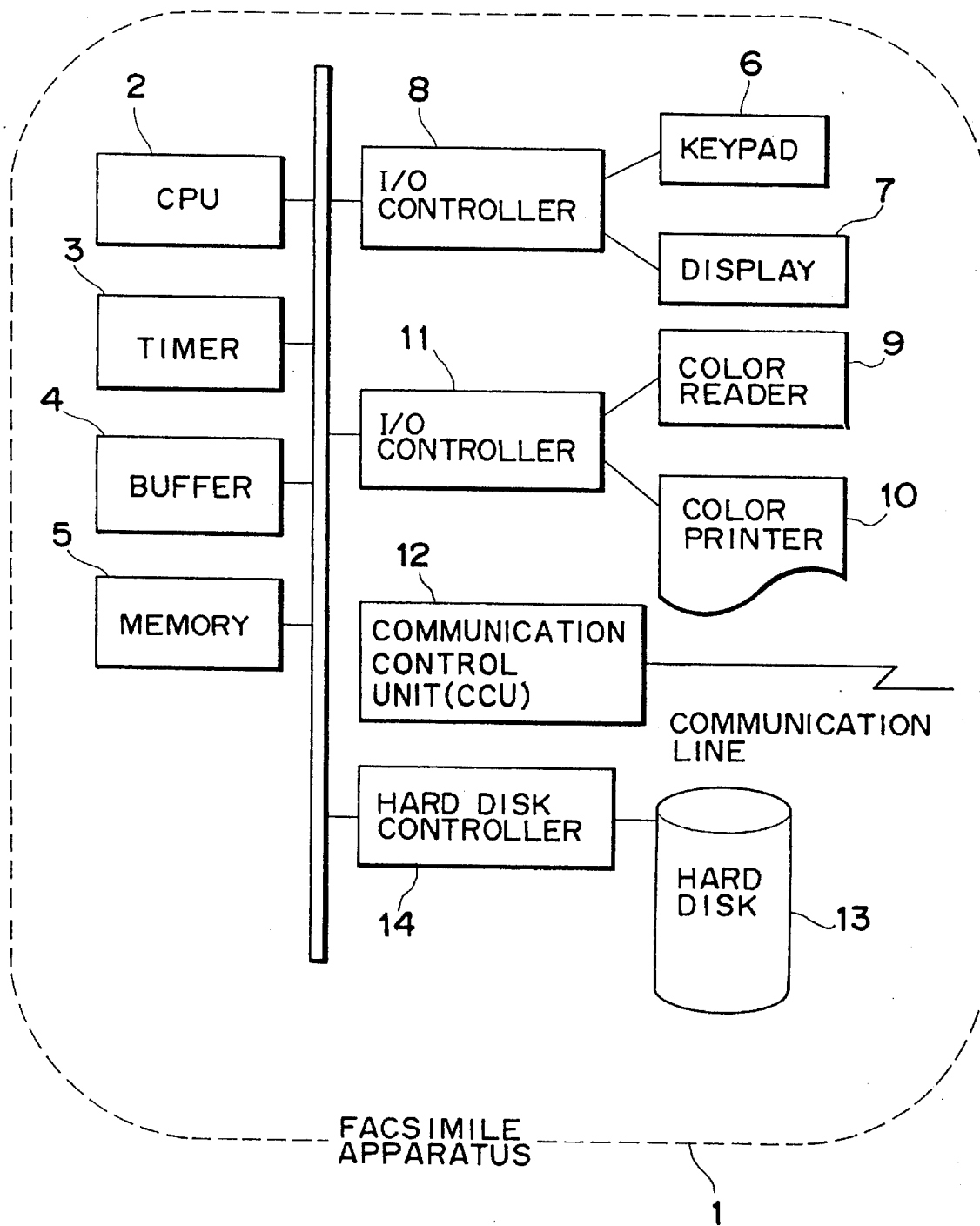
FIG. 1 is a block diagram showing a construction of a facsimile apparatus as a communicating apparatus according to an embodiment of the present invention.

FIG. 1 is a block diagram showing a construction of a facsimile apparatus embodying the present invention. In the diagram, reference numeral 1 denotes a facsimile apparatus comprising: a microprocessor 2 (hereinafter, referred to as a CPU) to control the whole facsimile apparatus 1; a timer 3 which is used to monitor various times; a buffer 4 which is used to accumulate and process image data; a memory 5 which is used to temporarily store a destination number or the like; a keypad 6 to execute various kinds of operations; a display 7 to display various kinds of messages; a first I/O (input/output) controller 8 to control the keypad 6 and display 7; a color reader 9 which is constructed by a reading optical system, a line sensor, and the like; a color printer 10 to generate an input document or the like; a second I/O controller 11 to control the color reader 9 and color printer 10; a communication control unit 12 to control the communication to a communication line; a hard disk 13 to store the image data of the input document or the like; and a hard disk controller 14 to control the hard disk 13.

Figure 7:
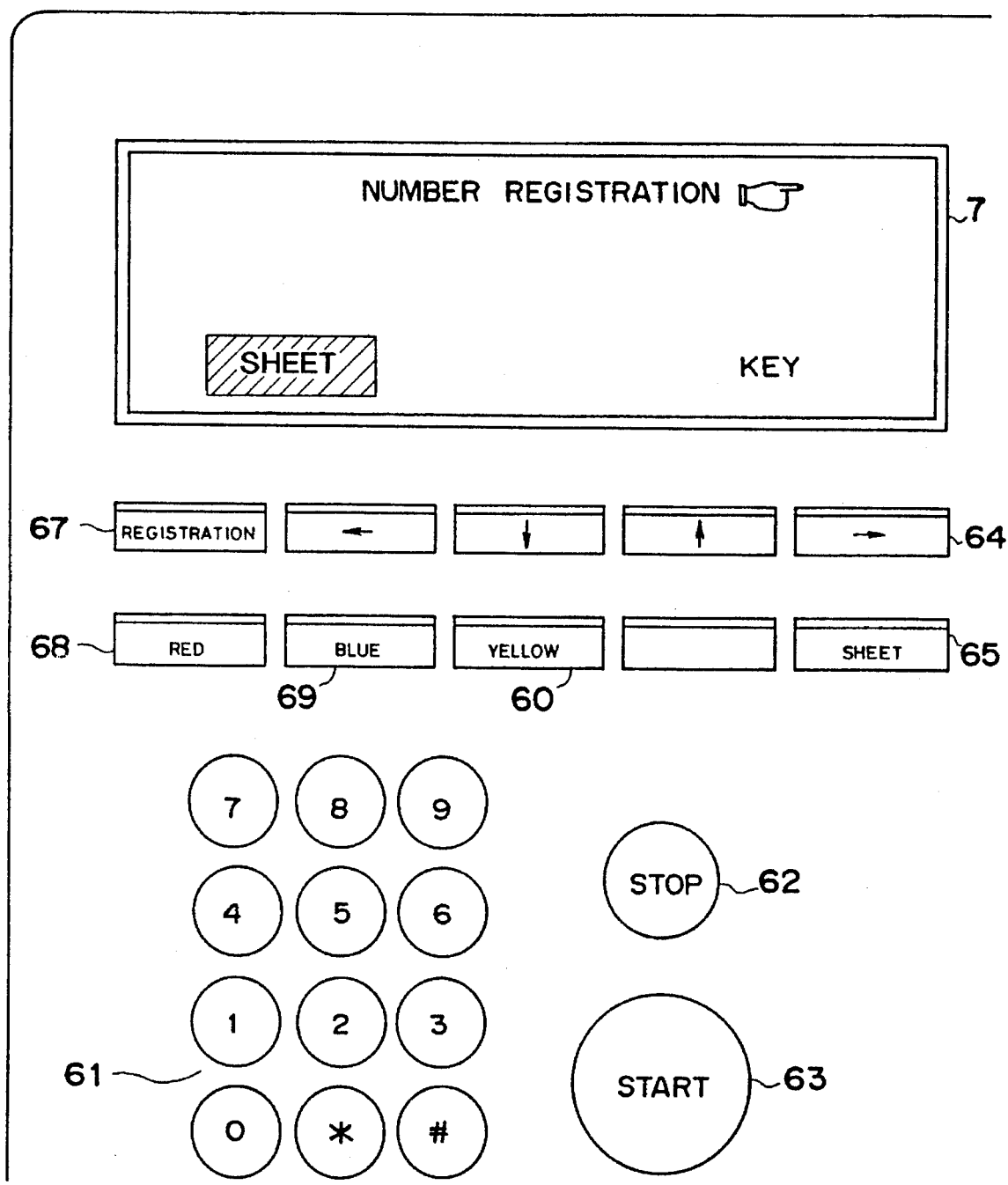
FIG. 7 is a diagram showing a keypad and a display.

FIG. 7 shows an external view of an operating section of the facsimile apparatus 1 embodying the present invention.

The operation of the facsimile apparatus 1 embodying the invention will now be described.

When a registration key 67 in FIG. 7 is depressed by the operator, a registering operation is started.

Figure 2:
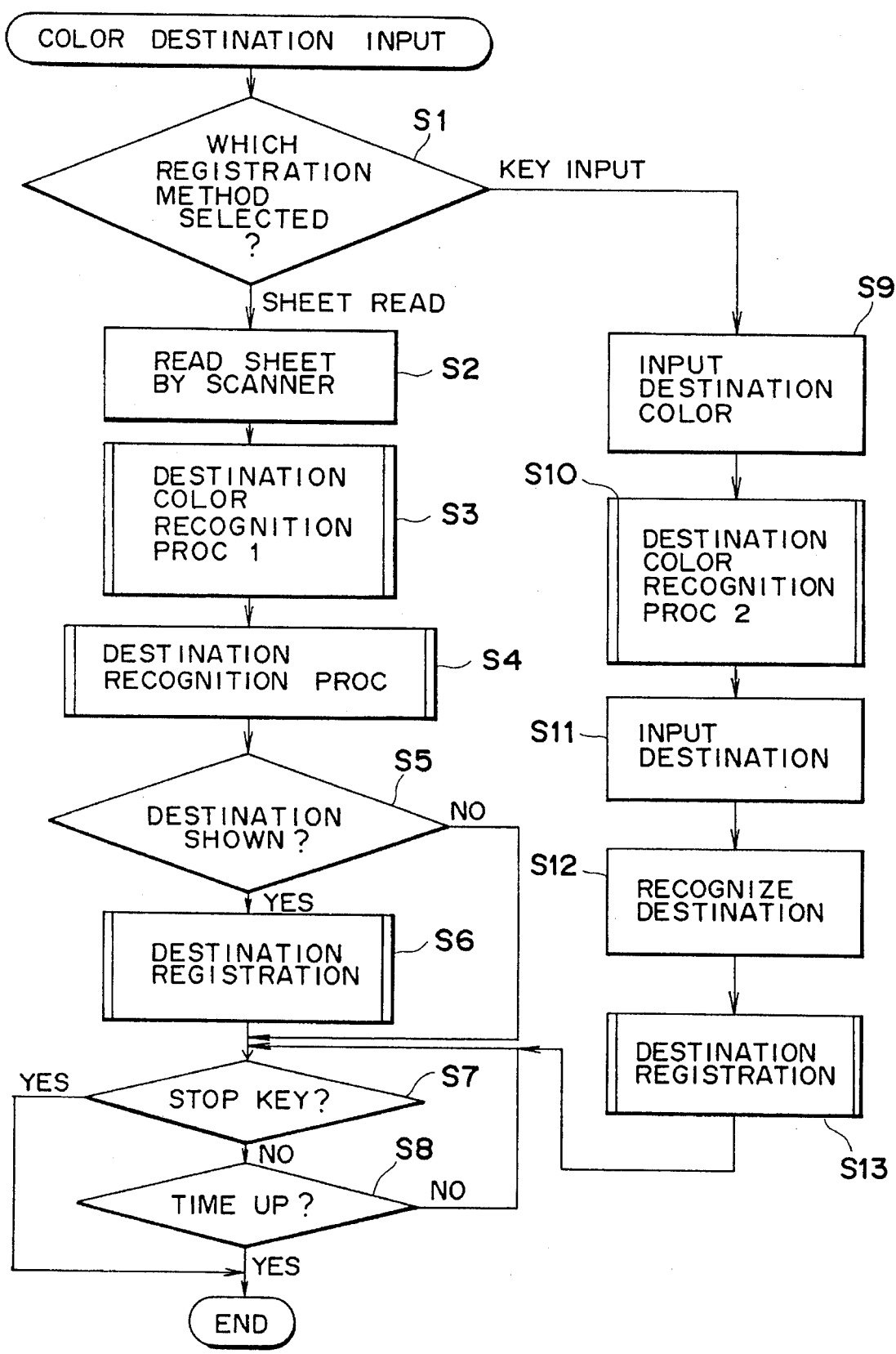
FIG. 2 is a flowchart showing a processing procedure for a registering operation to a facsimile apparatus.

As shown in the display 7 of FIG. 7, the operator selects a desired registration method by using cursor keys 64 in FIG. 7 with reference to a selection screen regarding the registration method (step S1 in FIG. 2). When the selected registration method indicates a sheet reading mode, the CPU 2 controls the I/O controller 11 so as to activate the color reader 9, thereby reading a registration special sheet as shown in FIG. 6 (step S2 in FIG. 2) and executing a destination color recognition processing (step S3 in FIG. 2). That is, the CPU recognizes the area in which a destination color is shown from the registration special sheet which has been read (step S14 in FIG. 3) and judges the destination color shown in such an area (step S24 in FIG. 3). On the basis of the result of the judgment, the CPU 2 judges whether the destination color of the area corresponding to the judged destination color is appropriate or not (step S34 in FIG. 3). If a NO result occurs in step S34, the CPU 2 controls the I/O controller 8 so as to allow the display 7 to display a message indicating that the destination color is inappropriate (step S44 in FIG. 3). The processing routine is finished.

Figure 3:
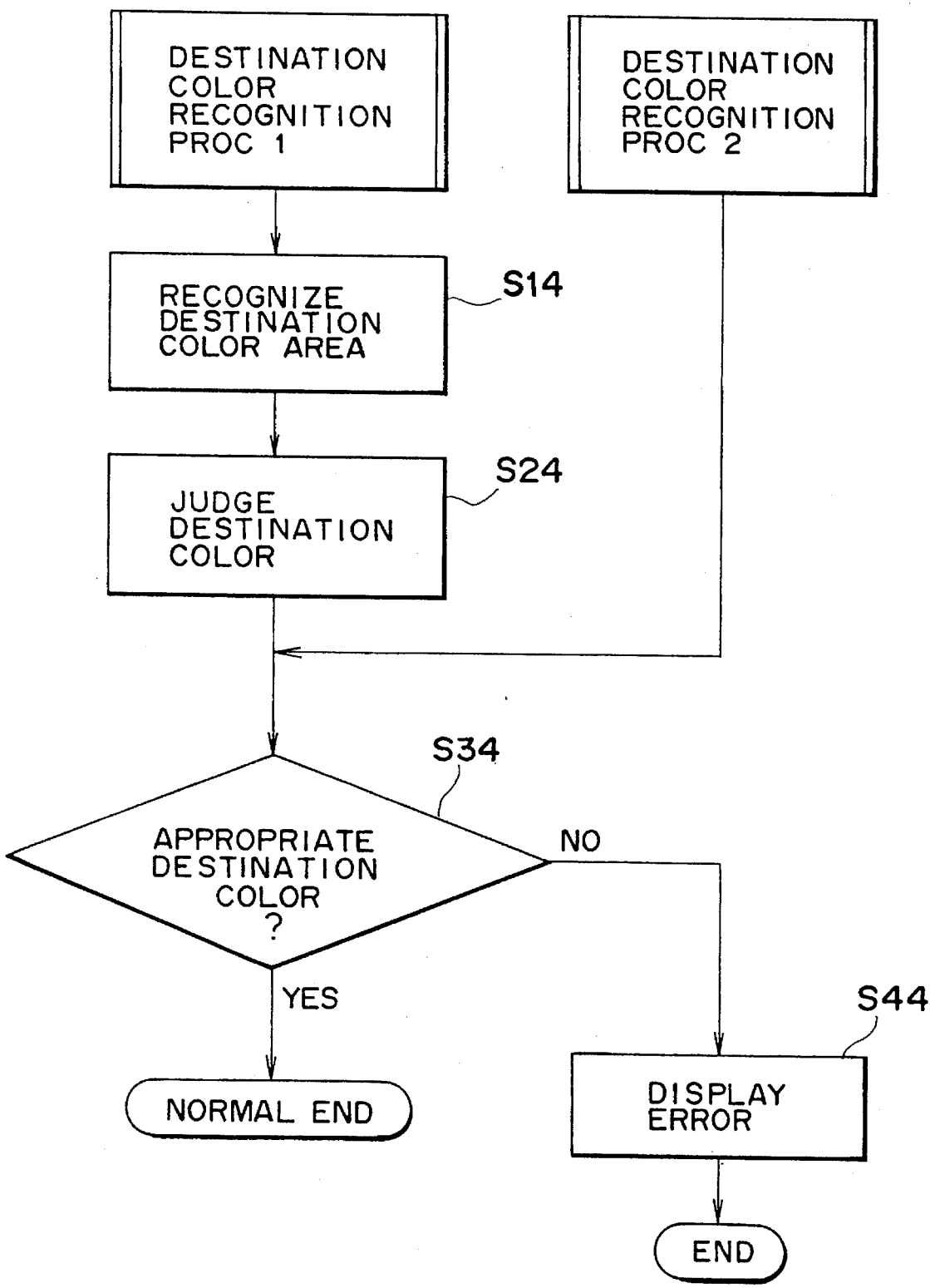
FIG. 3 is a flowchart showing a processing procedure for recognizing a destination color of a facsimile apparatus.
Figure 4:
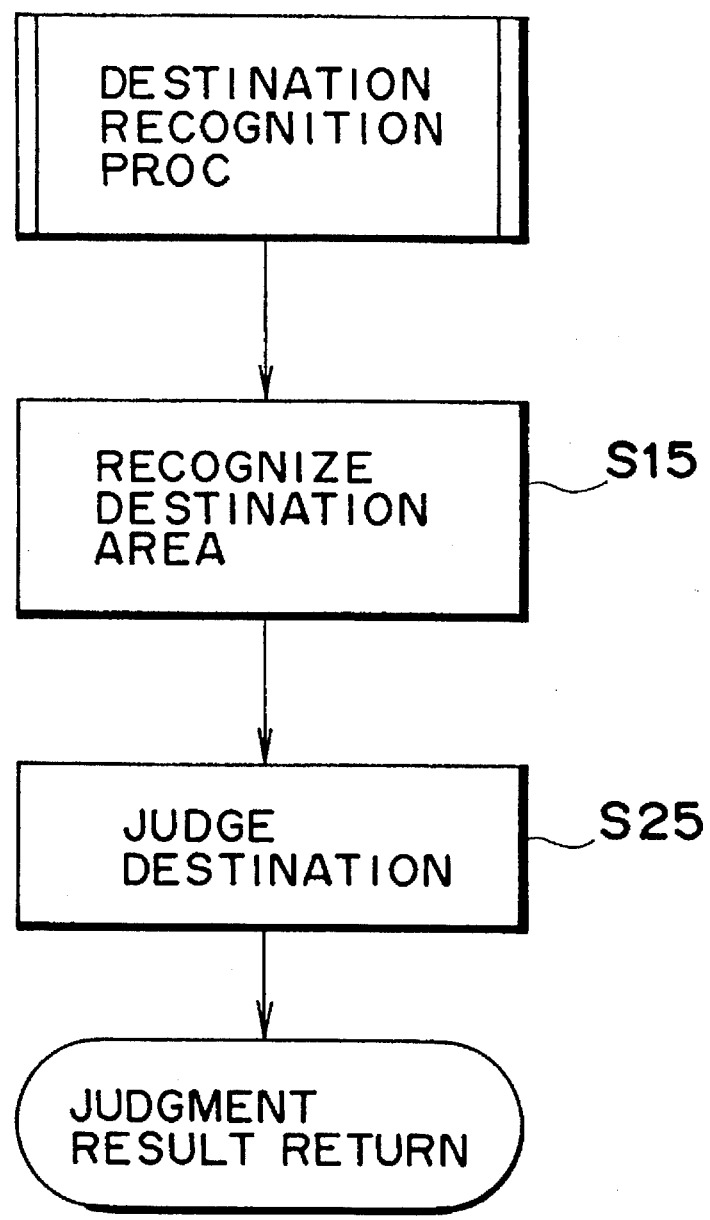
FIG. 4 is a flowchart showing a processing procedure for recognizing a destination of a facsimile apparatus.

When it is decided in step S34 in FIG. 3 that the destination color is appropriate, the CPU 2 executes a destination recognition processing (step S4 in FIG. 2). That is, the CPU 2 recognizes a predetermined area of the read registration special sheet in which the destination number corresponding to the judged destination color is shown (step S15 in FIG. 4). The destination number shown in the area is judged by a character recognition processing (step S25 in FIG. 4). On the basis of the result of the judgment, the CPU 2 judges whether the destination number is shown in the area of the destination number or not (step S5 in FIG. 2). If a NO result occurs in step S5, the elapse of a predetermined time is monitored by using the timer 3 and the CPU 2 judges whether the predetermined time has passed or not (step S8 in FIG. 2). If a NO result occurs in step S8, the CPU 2 discriminates whether a stop key 62 has been depressed or not (step S7 in FIG. 2). When the stop key 62 is not depressed, the processing routine is returned to the time monitoring step. If a YES result occurs in step S7, the registering operation is finished. If a YES result occurs in step S8 in FIG. 2, the registering operation is also finished.

Figure 5:
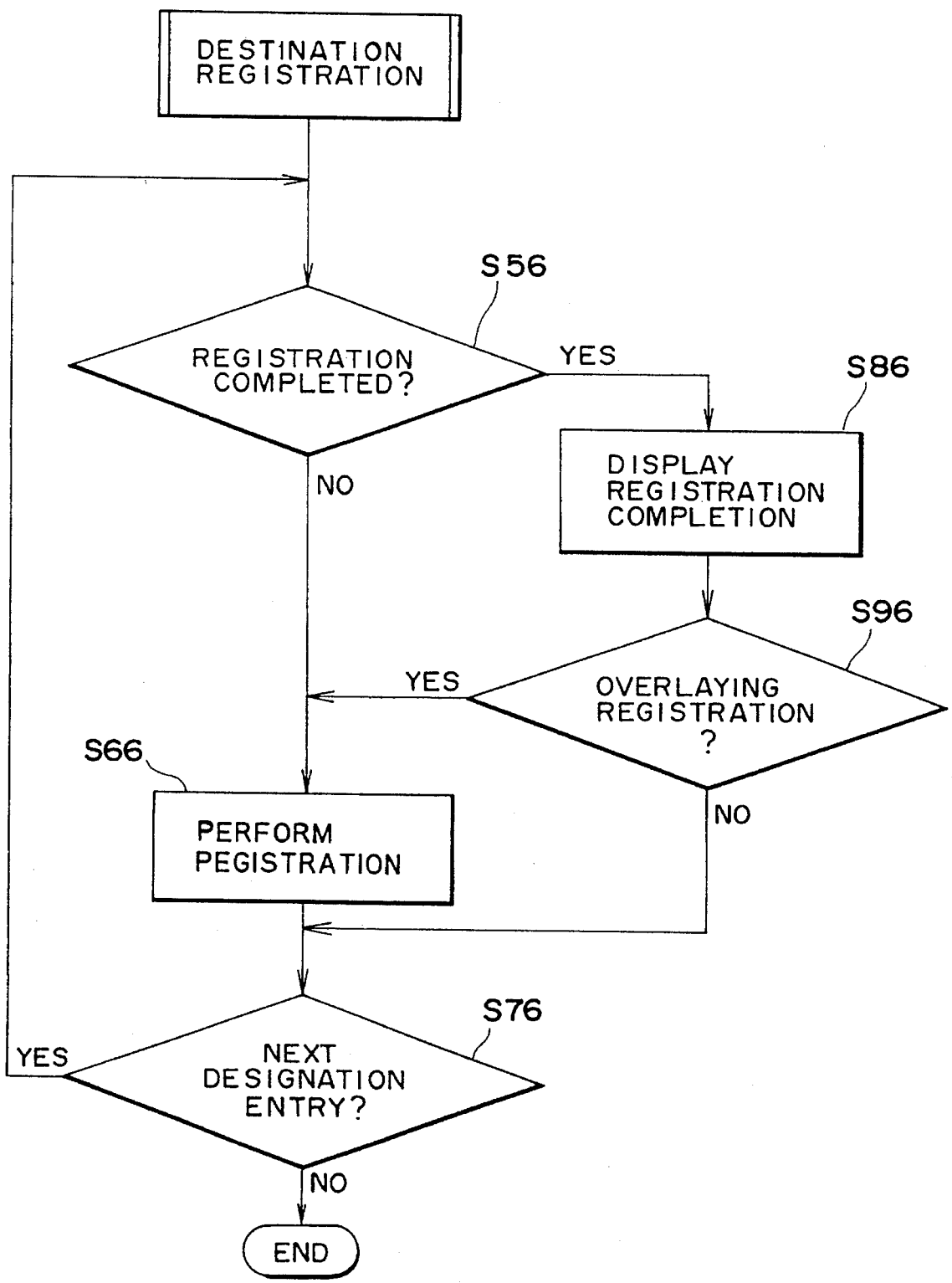
FIG. 5 is a flowchart showing a processing procedure for registering a destination of a facsimile apparatus.

When it is decided in step S5 in FIG. 2 that the destination number is shown, the CPU 2 judges whether the destination color or destination number has already been registered or not (step S56 in FIG. 5). If a YES result occurs, the CPU 2 controls the I/O controller 8 and allows the display 7 to display information to inform the operator of the fact that the designated destination color or destination number has already been registered (step S86 in FIG. 5). The CPU 2 subsequently instructs the operator to select whether the overlaying registration is executed or not by using the keypad 6 (start key 63) (step S96 in FIG. 5). When the overlaying registration is not executed, the information is not registered. When the overlaying registration is executed, the CPU 2 stores the destination color and destination number into the memory 5 in correspondence to each other and performs the overlaying registration of them (step S66 in FIG. 5). The CPU 2 judges whether there is a next designation entry or not (step S76 in FIG. 5). If a YES result occurs, the processing routine is returned to step S56 in FIG. 5 and the processes are repeated. If a NO result occurs, a registration end operation is executed and the registering operation is finished.

When the operator selects the registration by using the key input in step S1 in FIG. 2, the operator inputs color keys 60, 68, and 69 as shown in FIG. 7 (step S9 in FIG. 2). The CPU 2 subsequently executes a destination color recognition processing (step S10 in FIG. 2). That is, a check is made to see if the inputted destination color is appropriate or not (step S34 in FIG. 3). When it is inappropriate, the CPU 2 controls the I/O controller 8 so as to allow the display 7 to display a message indicative of such a fact (step S44 in FIG. 3). After that, the registration end operation is performed and the registering operation is finished. When it is decided that the destination color is appropriate, the operator inputs the destination number by using a ten-key key pad 61 in FIG. 7 (step S11 in FIG. 2). The CPU 2 recognizes the inputted destination number (step S12 in FIG. 2) and executes a registering operation similar to step S6 in FIG. 2 (step S13 in FIG. 2). After the registering operation has been performed, the registration end operation is started from step S7 in FIG. 2 and the registering operation is finished.

Upon originating call, the operator selects the originating call method by using the cursor key 64 with reference to the selection screen of the originating call method of the display 7. When the selected originating call method indicates the sheet reading mode, the CPU 2 reads an originating call special sheet and judges the destination color on which the destination color is shown. In correspondence to the judged destination color, the CPU 2 reads out the destination number registered in the memory 5 and sends from the communication control section 12 to the communication line.

When the selected originating call method is instructed by the key input, the CPU 2 sends the destination number from the communication control unit 12 to the communication line in accordance with the input from the keypad 6.

Although the registration method has been selected by the operator in the above embodiment, it is also possible to predetermine such a selection method by a system parameter of the facsimile apparatus. Although the stop key and timer have been used to execute the registration end operation, a similar effect can also be derived even when the processing routine is finishes on its own.

In case of an apparatus having a color image reader and a color image processing function, a similar effect is obtained by rewriting a registration content to another registration item of the destination number and by executing a registering operation by a similar processing procedure.

The number of destination colors is not limited to two colors (red and blue for YANON CO. LTD. shown in FIG. 6) but can be also set to three or more colors or one color.

The destination color can be also input from the image reader 9. The designation number can be also input from the ten-key keypad 61. In this case, the destination color corresponding to one destination is written on a color destination registration sheet and the destination number is input from the keypad 6.

According to the embodiment as described above, the destination numbers or the like can be classified by a combination of colors which can be easily visually sensed and the number of one-touch dial keys can be reduced or eliminated, so that there is an advantage such that an outside appearance is simplified and the design is improved. Since the troublesome operations are eliminated, the registering operation is simplified.

Although the present invention has been described on the basis of the preferred embodiment, the invention is not limited to the foregoing embodiment but many modifications and variations are possible within the spirit and scope of the appended claims of the invention.

What is claimed is:

1. A color image communicating apparatus comprising:

color image reader means for reading a sheet;

color information producing means for producing color information which is read out from a first predetermined area on a specific sheet read by said color image reader means;

destination information producing means for producing destination information which corresponds to the color information and which is read out from a second predetermined area of the specific sheet by said color image reader means;

registering means for registering a plurality of destination information and respective color information corresponding thereto; and generating means for generating an originating call by using one of the color information registered by said registering means.

2. An apparatus according to claim 1, wherein said destination information producing means produces the destination information by executing a character recognition processing to an image on the second predetermined area.

3. An apparatus according to claim 1, wherein said registering means has memory means for storing the plurality of destination information and the plurality of color information corresponding thereto.

4. A color image communicating apparatus comprising:

color image reader means for reading a sheet;

discriminating means for discriminating a kind of color which has been read by said color image reader means from a first predetermined area on a specific sheet and destination information in correspondence to the kind of color which has been read by said color image reader means from a second predetermined area on the specific sheet;

registering means for registering a plurality of kinds of colors and destination information corresponding thereto which have been discriminated by said discriminating means; and generating means for generating an originating call by using one of the destination information registered by said registering means.

5. A color image communicating apparatus comprising:

color image reader means for reading a sheet;

discriminating means for discriminating a kind of color which has been read by said color image reader means from a first predetermined area on a specific sheet and destination information in correspondence to the kind of color which has been read by said color image reader means from a second predetermined area on the specific sheet;

registering means for registering a plurality of kinds of colors and destination information corresponding thereto which have been discriminated by said discriminating means;

generating means for generating an originating call by using one of the destination information registered by said registering means; and key input means for inputting a kind of colors and the destination information corresponding thereto, wherein said registering means is able to store the kind of colors and the destination information which have been input by said key input means.

6. A color image communicating apparatus comprising:

color image reader means for reading a sheet;

producing means for producing a plurality of destination information which was written on at least one sheet;

registering means for registering the plurality of destination information;

reading means for reading out one of the plurality of destination information from said registering means in accordance with a kind of color which has been read by said color image reader means from a predetermined area on another sheet; and generating means for generating an original call by using the one of the destination information which has been read out from said registering means.

7. A color image communicating method comprising the steps of:

producing a plurality of destination information which was written on at least one sheet;

registering the plurality of destination information;

discriminating a kind of color of a color image by reading a predetermined area of another sheet; and generating an originating call by using one of the plurality of destination information registered at said registering step in accordance with the kind of color which has been discriminated in said discriminating step.

8. A color image communicating apparatus comprising:

color image reader means for reading a color image;

transmitting means for transmitting the color image read by said reader means;

first producing means for producing color information corresponding to a color image read from a first area of a sheet by said reader means;

second producing means for producing destination information read from a second area of the sheet which correspond to the color information; and registering means for registering the color information and the destination information.

9. An apparatus according to claim 8, wherein said second producing means produces the destination information by recognizing a character in the image read by said reader means.

10. A color image communicating apparatus comprising:

color image reader means for reading a color image;

transmitting means for transmitting the color image read by said reader means;

storing means for storing a plurality of destination information which were written on at least one sheet and obtained by reading the one sheet; and reading means for reading out one of the destination information stored in said storing means in accordance with a kind of color which is read from a predetermined area of another sheet by said reader means.

11. A color image communicating method comprising the steps of:

reading color images;

storing a plurality of destination information which were written in at least one of the color images;

discriminating a kind of color in another of the color images; and transmitting other color images to the destination corresponding to one of the plurality of destination information read out from said storing means in accordance with the kind of color discriminated in said discriminating step.

12. A color image communication method comprising the steps of:

reading color images;

producing destination information written in a predetermined area in a color image read in said reading step, the destination information corresponding to a kind of color read from another predetermined area in the color image; and transmitting another of the color images to a destination corresponding to the destination information produced in said producing step.

13. A color image communication apparatus, comprising:

register means for reading a color image by using a predetermined color image reader means, so as to register a color of the read image and a destination corresponding to the color;

judgment means for judging the color of the color image read by said color image reader means; and transmission means for reading from said register means the destination corresponding to the color judged by said judgment means, and transferring image data to the read destination.

14. An apparatus according to claim 13, wherein said register means registers a color input by means of a key and also registers a color read by using said color image reader means.

15. An apparatus according to claim 13; wherein said register means inputs the destination by means of a key and also reads the destination by using said color image reader means.

16. A color image communication method comprising:

a register step of reading a color image by using a predetermined color image reader means; so as to register a color of the read image and a destination corresponding to the color in a register means;

a judgment step of judging the color of the color image read by the color image reader means; and a transmission step of reading from the register means the destination corresponding to the color judged in said judgment step, and transferring image data to the read destination.

* * * * *

UNITED STATES PATENT AND TRADEMARK OFFICE
CERTIFICATE OF CORRECTION

PATENT NO. : 5,581,374

DATED : December 3, 1996

INVENTOR(S) : FUMIO SHOJI

It is certified that error appears in the above-identified patent and that said Letters Patent is hereby corrected as shown below:

<u>IN THE DRAWINGS</u>

Sheet 5 OF 7, FIG. 5, "PEGISTRATION" should read --REGISTRATION--.

<u>COLUMN 3</u>

Line 50, "is" should be deleted.

<u>COLUMN 5</u>

Line 46, "correspond" should read --corresponds--.

<u>COLUMN 6</u>

Line 13, "mation" should read --mation which is--.
Line 51, "means;" should read --means,--.

Signed and Sealed this

Twentieth Day of May, 1997

Attest:

BRUCE LEHMAN

*Attesting Officer*  *Commissioner of Patents and Trademarks*